(12) United States Patent
Ko

(10) Patent No.: US 6,950,647 B2
(45) Date of Patent: Sep. 27, 2005

(54) LOCKING METHOD IN A MOBILE TERMINAL

(75) Inventor: Bok-You Ko, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 624 days.

(21) Appl. No.: 09/790,244

(22) Filed: Feb. 21, 2001

(65) Prior Publication Data

US 2001/0016486 A1 Aug. 23, 2001

(30) Foreign Application Priority Data

Feb. 22, 2000 (KR) .......................................... 2000-8421

(51) Int. Cl.$^7$ .......................... H04M 3/16; H04M 1/00; H04Q 7/00
(52) U.S. Cl. ...................... 455/411; 455/410; 455/517; 455/550.1; 455/551; 455/566
(58) Field of Search ...................... 455/409–411, 550.1, 455/551, 565, 566

(56) References Cited

U.S. PATENT DOCUMENTS

| | | | |
|---|---|---|---|
| 5,732,133 A | | 3/1998 | Mark |
| 5,842,124 A | * | 11/1998 | Kenagy et al. ............. 455/418 |
| 5,862,472 A | | 1/1999 | Park |
| 5,887,253 A | | 3/1999 | O'Neil et al. |
| 5,907,804 A | * | 5/1999 | Schroderus et al. ........ 455/411 |
| 5,940,773 A | | 8/1999 | Barvesten |
| 5,956,633 A | * | 9/1999 | Janhila ....................... 455/410 |
| 6,125,273 A | * | 9/2000 | Yamagishi .................. 455/411 |
| 6,223,290 B1 | * | 4/2001 | Larsen et al. ............... 455/410 |
| 6,259,908 B1 | * | 7/2001 | Austin ........................ 455/411 |
| 6,266,541 B1 | * | 7/2001 | Noda .......................... 455/565 |
| 6,272,332 B1 | * | 8/2001 | Matsumoto et al. ...... 455/412.1 |
| 6,314,283 B1 | * | 11/2001 | Fielden ....................... 455/411 |
| 6,360,092 B1 | * | 3/2002 | Carrara ....................... 455/410 |
| 6,449,492 B1 | * | 9/2002 | Kenagy et al. ........... 455/550.1 |
| 6,542,729 B1 | * | 4/2003 | Chmaytelli et al. ......... 455/410 |

FOREIGN PATENT DOCUMENTS

| | | |
|---|---|---|
| JP | 6-216841 | 8/1994 |
| JP | 7-147694 | 6/1995 |

OTHER PUBLICATIONS

European Search Report dated Jul. 30, 2003 issued in Application No. 01104295.9.
Chinese Office Action dated Oct. 10, 2003 issued in a counterpart application, namely, Appl. No. 01104978.2.

\* cited by examiner

*Primary Examiner*—William Trost
*Assistant Examiner*—Meless Zewdu
(74) *Attorney, Agent, or Firm*—Dilworth & Barrese LLP

(57) ABSTRACT

A locking method for a mobile terminal is disclosed. In the method, it is determined whether an input lock code matches a stored lock code. When the input lock code is incorrect, the mobile terminal displays a phone number of a service provider. In the meantime, if a phone number is input which is identical to the displayed phone number of the service provider, the mobile terminal allows a normal outgoing call only to the phone number of the service provider. Further, the mobile terminal displays a present status of the mobile terminal, indicating occurrence of an input error of a lock code, when the input lock code does not match the stored lock code.

9 Claims, 4 Drawing Sheets

LOCKING METHOD IN A MOBILE TERMINAL

This application claims priority to an application entitled "Locking Method in a Mobile Terminal" filed in the Korean Industrial Property Office on Feb. 22, 2000 and assigned Ser. No. 2000-8421, the contents of which are hereby incorporated by reference.

BACKGROUND OF THE INVENTION

1. Field of the Invention

The present invention relates generally to a mobile terminal such as a mobile phone, and in particular, to a locking method in a mobile terminal.

2. Description of the Related Art

In general, a mobile terminal has a locking function to prevent fraudulent use by others and to prevent the misappropriation of personal information stored therein. Since the mobile terminal is generally used for individual use by a specific person, the manufacturer must provide a safe locking function to guarantee the user's privacy. However, the user may frequently forget a lock code (or password), since he or she typically has many lock codes to memorize, such as a password of a bank account, or a password of an Internet site. In this case, the user must inquire of the service provider about the lock code. However, most users tend to forget information (e.g., phone number and location) about the service provider as time goes by.

A European mobile terminal includes a SIM (Subscriber Identification Module) card, which is detachable from the main body of the terminal, and the terminal cannot perform communication when SIM crash occurs due to an erroneous input of the lock code. In addition, when the user cannot unlock the SIM card because he or she has forgotten the lock code, only the SOS call (or emergency call) is available. To unlock the SIM card, the user must personally visit the service provider and update the SIM card. For reference, the lock code system of the European mobile terminal is comprised of a phone lock code, a first lock code (or PIN lock code) and a second lock code (or PUK lock code).

Accordingly, there has been a demand for a mobile terminal which provides service provider information when an incorrect lock code is input.

SUMMARY OF THE INVENTION

It is, therefore, an object of the present invention to provide a method for displaying a current status of a mobile terminal and information, preferably a phone number, of the service provider and enabling a call only to the service provider, when an incorrect lock code is input a predetermined number of times in the mobile terminal having a locking function.

To achieve the above and other objects, there is provided a locking method in a mobile terminal. In the method, it is determined whether an input lock code is correct. This is done by comparing the input lock code with a stored lock code to determine if it matches. When the input lock code is incorrect, i.e. does not match the stored lock code, the mobile terminal displays information, preferably a phone number, of a service provider. In the meantime, if a phone number is input which is identical to the displayed phone number of the service provider, the mobile terminal allows a normal outgoing call only to the phone number of the service provider.

Further, the mobile terminal displays a present status of the mobile terminal, indicating occurrence of an input error of a lock code, when the input lock code is incorrect.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
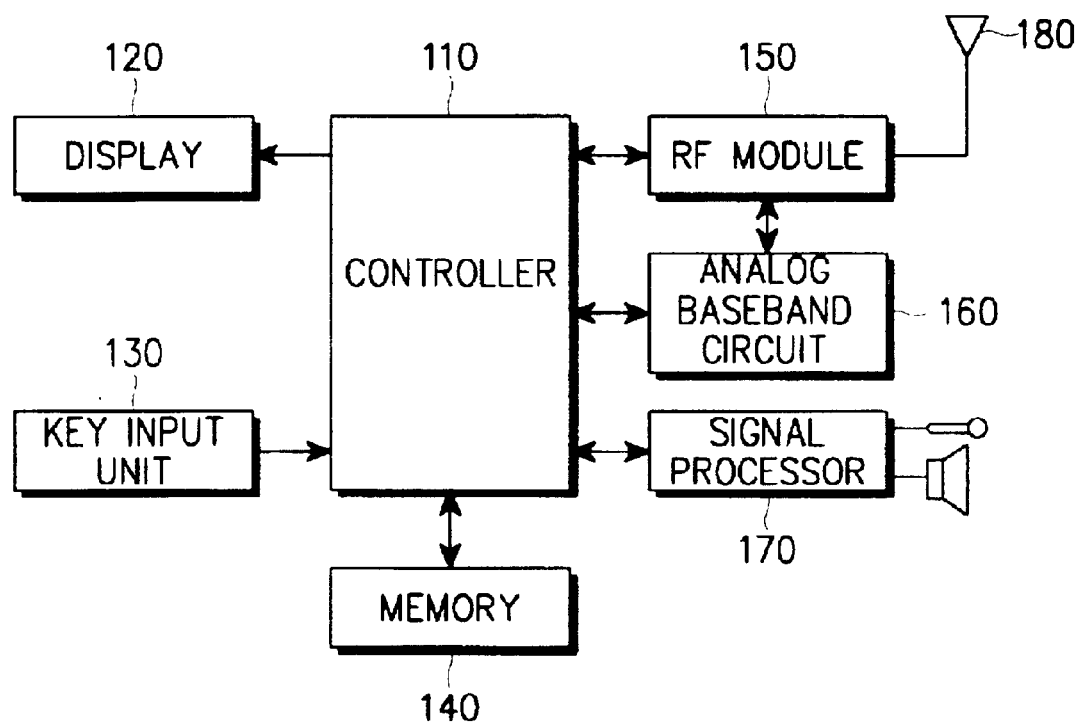
FIG. 1 is a block diagram illustrating a mobile terminal to which the present invention is applicable.

FIG. 1 shows a block diagram of a mobile terminal to which the present invention is applicable.

Referring to FIG. 1, a controller 110 controls the overall operation of the mobile terminal, including a call processing function. A memory 140 is comprised of a ROM (Read Only Memory) for storing an operating program, an EEPROM (Electrically Erasable and Programmable ROM), a RAM (Random Access Memory) and a flash memory. In particular, the memory 140 stores a program for displaying, when an incorrect lock code is input, information regarding a service provider, preferably a phone number of a service provider, on a display of the mobile terminal and allowing a call only to the service provider according to an embodiment of the present invention. In addition, the memory 140 stores the lock codes and the current status information of the mobile terminal which may be displayed in the event of an input error of the lock codes.

A display 120 is comprised of an LCD (Liquid Crystal Display) and displays the status of the mobile terminal and the progress of the operating program under the control of the controller 110. In particular, the display 120 according to an embodiment of the present invention displays, when there occurs an input error of the lock code, the phone number of the service provider and the present status of the mobile terminal. A key input unit 130 includes a plurality of alphanumeric keys and function keys, and generates key input data according to key manipulation by the user. The key input data is provided to the controller 110. An RF (Radio Frequency) module 150 up-converts a signal provided from an analog baseband circuit 160 and transmits the up-converted signal to a base station (now shown) through an antenna ANT 180, under the control of the controller 110. Further, the RF module 150 down-converts a radio signal received through the antenna 180 and provides the down-converted signal to the analog baseband circuit 160. The analog baseband circuit 160 converts the signal provided from the RF module 150 into a baseband digital signal and provides the converted signal to the controller 110. Further, the analog baseband circuit 160 processes a signal output from the controller 110 and provides the processed signal to the RF module 150. A signal processor 170 converts and compresses an audio signal received through a microphone MIC. Further, the audio processor 170 restores a received compressed audio signal to its original audio signal and outputs the restored audio signal through a speaker SPK as an audible signal.

More specifically, the controller 110 according to the present invention performs the following operations.

The controller 110 performs a general call control process between the base station and the mobile terminal. Further, the controller 110 sets or releases the locking function in response to a menu selection by the user. In addition, the controller 110 recognizes a lock code input by the user through the key input unit 130 and determines whether the input lock code is identical to a predetermined lock code. When there occurs an input error of the lock code, the controller 110 displays on the display 120 the phone number of the service provider, stored in the memory 140, and the present status of the mobile terminal. At this moment, the mobile terminal is maintained in a locked state. In the locked state, the mobile terminal allows an origination (or outgoing) call only to the phone number of the service provider.

Figure 2:
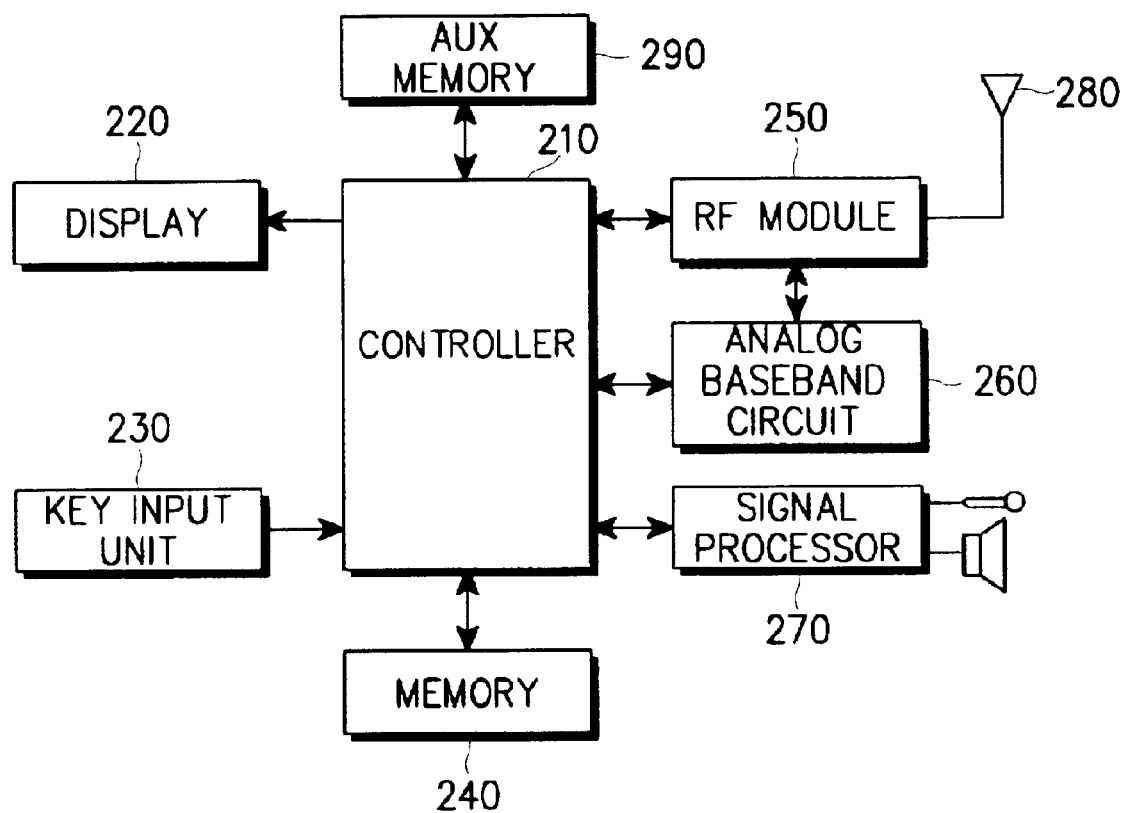
FIG. 2 is a block diagram illustrating another mobile terminal to which the present invention is applicable.

FIG. 2 shows another mobile terminal to which the present invention is applicable.

As illustrated, the mobile terminal of FIG. 2 has the same structure as the mobile terminal of FIG. 1 except for an auxiliary memory 290. The auxiliary memory 290 is a SIM card detachable from the main body of the mobile terminal. The auxiliary memory 290 stores the user's unique information such as a phone number, a first lock code and a second lock code. The first lock code is a personal identification number (PIN) code, and the second lock code is a (PUK) code. When the auxiliary memory 290 is attached to the mobile terminal, a controller 210 requests the user to input a lock code of the main terminal body, stored in a memory 240, and the first and second lock codes stored in the SIM card auxiliary memory 290, while maintaining the locked state.

Thereafter, when correct lock codes are input under preset conditions, the controller 210 releases the lock function. Here, the "preset condition" may refer to a condition in which the input lock codes are identical to at least one of the first and second lock codes stored in the auxiliary memory 290 and the lock code of the main terminal body. There may also be a requirement that the lock codes are entered within a predetermined time period.

When the preset condition is not satisfied and the first or second lock code input by the user is not correct, the controller 210 stores the corresponding information in the auxiliary memory 290 and disables every operation of the mobile terminal until the auxiliary memory 290 is normally updated.

When there occurs an input error of the lock code, the controller 210 displays on the display 220 the phone number of the service provider, stored in the memory 240, and the present status of the mobile terminal, while maintaining the locked state. In this state, the mobile terminal allows an origination call only to the phone number of the service provider.

Figure 3:
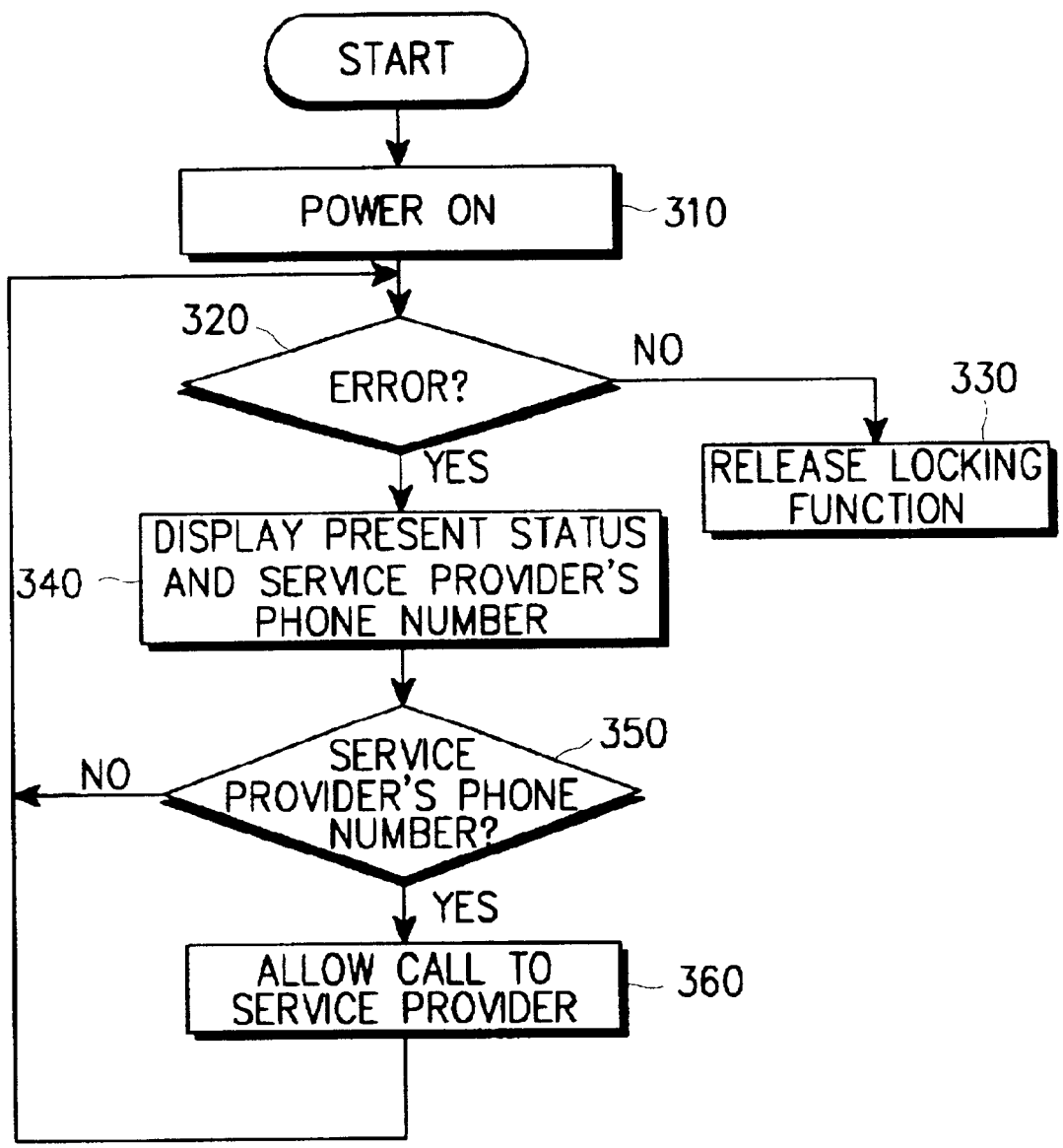
FIG. 3 is a flow chart illustrating a procedure for displaying, when an incorrect lock code is input, a phone number of a service provider on a display of the mobile terminal according to an embodiment of the present invention.

FIG. 3 shows a procedure for displaying, when an incorrect lock code is input, a phone number of the service provider on a display of the mobile terminal according to an embodiment of the present invention.

Now, with reference to FIGS. 1 and 3, a detailed description will be made of a preferred embodiment of the present invention.

When the mobile terminal is turned on in step 310, the controller 110 sets, in step 320, the locking function and determines whether a lock code error has occurred by comparing a lock code input by the user through the key input unit 130 with a predetermined lock code stored in the memory 140. If the input lock code is correct, the controller 110 releases the locking function in step 330.

Otherwise, if the input lock code is incorrect, i.e., if the input lock code is not identical to the lock code read from the memory 140, the controller 110 displays the present status of the mobile terminal and the phone number of the service provider on the display 120, in step 340. At this moment, the locked state is maintained. Here, the "present status" refers to a lock code error-occurred status.

After step 340, the controller 110 determines in step 350 whether a series of keys are input by the user through the key input unit 130 and whether the input keys are identical to the phone number of the service provider, displayed on the display 120. If the input keys are identical to the phone number of the service provider, the controller 110 allows a call only to the phone number of the service provider in step 360. That is, even in the locked state, the mobile terminal can make a normal outgoing call to the phone number of the service provider.

Otherwise, if the input keys are not identical to the phone number of the service provider in step 350, the controller 110 returns to step 320 and performs its succeeding steps.

Figure 4:
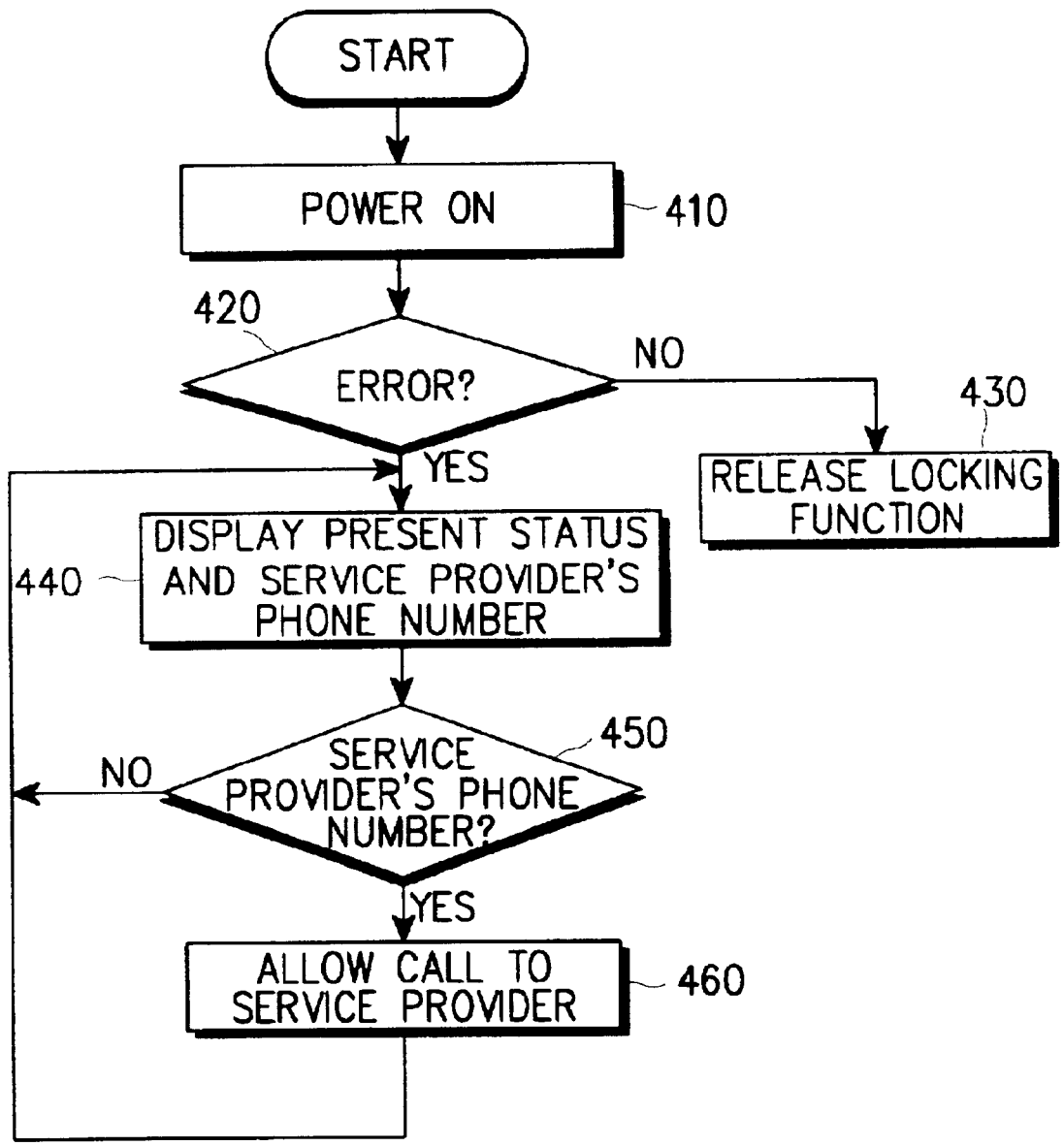
FIG. 4 is a flow chart illustrating a procedure for displaying, when an incorrect lock code is input, a phone number of a service provider on a display of the mobile terminal according to another embodiment of the present invention.

FIG. 4 shows a procedure for displaying, when an incorrect lock code is input, a phone number of the service provider on a display of the mobile terminal according to another embodiment of the present invention.

Now, with reference to FIGS. 2 and 4, a detailed description will be made of another preferred embodiment of the present invention.

When the mobile terminal is turned on in step 410, the controller 210 determines in step 420 whether a lock code input by the user through the key input unit 230 having a preset condition is incorrect. Here, the "preset condition" refers to a condition in which a correct lock code is input within a predetermined number of attempts. In addition, the "present condition" refers to a condition in which the input lock codes are identical to both the first and second lock codes stored in the auxiliary memory 290 and the lock code of the main body, stored in the memory 240. If the input lock code is correct, the controller 210 releases the locking function in step 430.

Otherwise, if the input lock code is incorrect, the controller 210 displays the present status of the mobile terminal and the phone number of the service provider on the display 220, in step 440. At this moment, the locked state is maintained. Here, the "present status" refers to a lock code error-occurred status.

After step 440, the controller 210 determines in step 450 whether a series of keys are input by the user through the key input unit 230 and whether the input keys are identical to the phone number of the service provider, displayed on the display 220. If the input keys are identical to the phone number of the service provider, the controller 210 allows a call only to the phone number of the service provider in step 460. That is, even in the locked state, the mobile terminal can make a normal outgoing call to the phone number of the service provider. After the call is made, the controller 210 returns to step 440, thus requiring the user to visit the service provider to have the locking function released.

Otherwise, if the input keys are not identical to the phone number of the service provider in step 450, the controller 210 returns to step 440 and performs its succeeding steps.

Unlike the mobile terminal of FIG. 3, the mobile terminal of FIG. 4 does not provide a function of releasing the mobile terminal by itself when an input error occurs, so that the user must personally visit the service provider to update the auxiliary memory 290. Therefore, by displaying the present status of the mobile terminal and the phone number of the service provider on the display, it would be very convenient for the user to make an inquiry call to the service provider to schedule a visit.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A locking method in a mobile terminal, comprising the steps of:

receiving a lock code input by a user of the mobile terminal;

determining whether the input lock code matches a stored lock code and at least one of first or second lock codes stored in an auxiliary memory of the mobile terminal; and displaying a telephone number regarding a service provider, when the input lock code does not match, and allowing a normal outgoing call only to the service provider, wherein the outgoing call is allowed when a phone number is input, which is identical to the displayed telephone number of the service provider.

2. The method as claimed in claim 1, further comprising the step of displaying a present status of the mobile terminal, indicating occurrence of an input error of a lock code, when the input lock code does not match.

3. A method for controlling a locking function in a mobile terminal, comprising the steps of:

(a) receiving a lock code input by a user of the mobile terminal;

(b) determining whether the input lock code matches a stored lock code and at least one of first or second lock codes stored in an auxiliary memory of the mobile terminal;

(c) releasing the locking function, when the input lock cock matches the stored lock code and matches at least one of the first or second lock codes;

(d) displaying a phone number of a service provider, when the input lock code does not match; and (e) allowing a normal outgoing call only to the phone number of the service provider, when a phone number is input which is identical to the displayed phone number of the service provider, and returning to the step (b).

4. A method for controlling a locking function in a mobile terminal having an auxiliary memory which is detachable from a main body of the mobile terminal, comprising the steps of:

storing a lock code of the main body and storing first and second lock codes of the auxiliary memory;

when the auxiliary memory is attached to the main body, releasing the locking function if it is determined that lock codes input by a user match the stored lock codes;

displaying a phone number of a service provider while maintaining the locking function, if the input lock codes do not match the stored lock codes; and allowing a normal outgoing call only to the phone number of the service provider, when a phone number is input which is identical to the displayed phone number of the service provider.

5. The method as claimed in claim 4, wherein the first lock code is a personal identification number and the second lock code is a Personal Unlocking Key (PUK) code.

6. The method as claimed in claim 4, further comprising the step of displaying a present status of the mobile terminal, indicating occurrence of an input error of a lock code, when the input lock code does not match the stored lock code.

7. The method as claimed in claim 4, wherein lock codes must be input within a predetermined time period.

8. The method as claimed in claim 4, wherein after the outgoing call is made to the service provider, the user must visit the service provider to release the locking function.

9. The method as claimed in claim 1, further comprising unlocking the mobile terminal when the input lock code matches the stored lock code and matches at least one of the first or second lock codes.

* * * * *